(No Model.)
J. KOUNTZ.
METHOD OF PURIFYING AND ODORIZING NATURAL GAS.
No. 316,465. Patented Apr. 28, 1885.
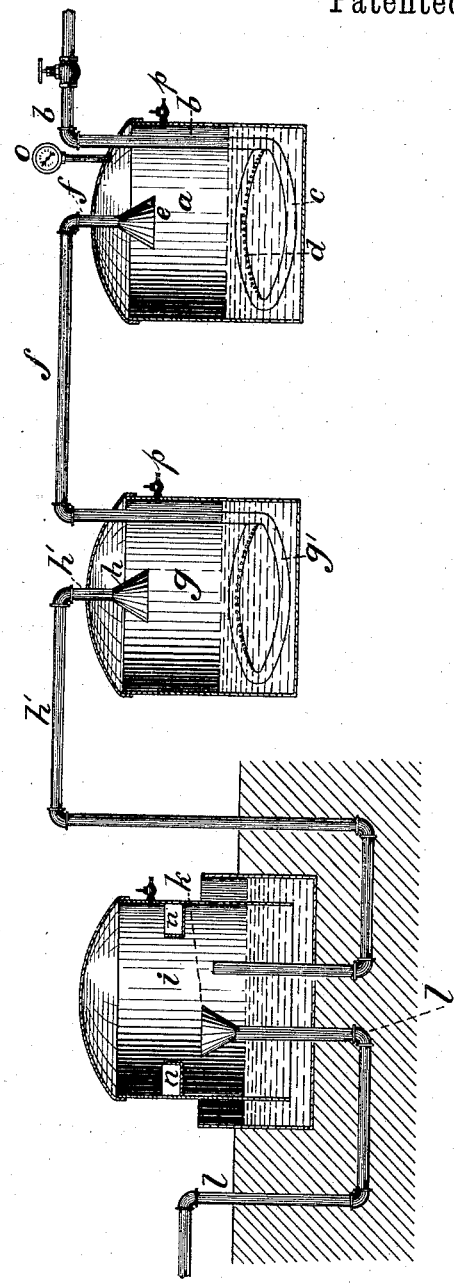
Witnesses.
M. B. Corwin
J. A. Burns.
Inventor.
Joseph Kountz
by Bakewell & Kerr
his Attorneys

UNITED STATES PATENT OFFICE.

JOSEPH KOUNTZ, OF PITTSBURG, PENNSYLVANIA.

METHOD OF PURIFYING AND ODORIZING NATURAL GAS.

SPECIFICATION forming part of Letters Patent No. 316,465, dated April 28, 1885.

Application filed November 28, 1884. (No model.)

*To all whom it may concern:*

Be it known that I, JOSEPH KOUNTZ, of Pittsburg, in the county of Allegheny and State of Pennsylvania, have invented a new and useful Improvement in Method of Purifying and Odorizing Natural Gas; and I do hereby declare the following to be a full, clear, and exact description thereof, reference being had to the accompanying drawing, forming a part of this specification, which is a vertical sectional view of the apparatus employed by me.

My invention consists in purifying natural gas by passing it through solutions of lime and sulphuric acid, and in imparting an odor to the gas by bringing it in contact with asafetida, as is hereinafter more fully set forth.

In the drawing, $a$ represents a tank formed of any suitable material, preferably, however, of sheet metal, leading into which is the gas-supply pipe $b$, which extends inside of the tank to a point at or near the bottom thereof, where it forms a coil, as shown at $c$, in which are jet-openings $d$, pointing downward toward the bottom of the tank. At the top of the tank $a$, inside thereof, is an inverted funnel, $e$, from which a pipe, $f$, extends through the top of the tank $a$ into the second tank, $g$, which is similar to the tank $a$, and there forms a coil, $g'$, at or near the bottom of the tank, which coil is provided with perforations similar to those in the coil $c$. At the top of the tank $g$ is an inverted funnel, $h$, from which the pipe $h'$ leads into a third tank or gasometer, $i$, at the bottom thereof, and extends upward inside of the gasometer to a point at about the center thereof. Inside of the gasometer $i$ is a funnel, $k$, from which a pipe, $l$, leads to the gas-service conduit-pipe.

Within the tank $a$ is placed a sufficient quantity of white lime and water (a saturated solution) to cover the coil $c$, and in the tank $g$ is placed a like quantity of sulphuric acid and water. These two tanks $a$ and $g$ should be lined with lead or other suitable material capable of resisting the chemical action of the lime and sulphuric acid.

At the bottom of the gasometer $i$ is the usual amount of water, above which, in suitable receptacles, $n$, is placed a small quantity of asafetida, the purpose of which is to impart an odor to the odorless and purified natural gas.

On the tank $a$ is a pressure-gage, $o$, and on both the tanks $a$ and $g$ are test-gages $p$.

The gas passing from the main or source of supply through the pipe $b$ and coil $c$ comes in contact with the solution of lime, and thence passes into the body of the tank, from which it passes through the funnel $e$ and pipe $f$ into the tank $g$, where it passes through the sulphuric acid and water into the body of the tank, and thence through the pipe $h'$ into the gasometer $i$, where, having been purified in the tanks $a$ and $g$, it comes in contact with the asafetida, and is thereby odorized. From the gasometer the gas is drawn off through the pipe $l$ in the usual manner.

The advantages of my improved method are that all impurities and foreign matter are removed from the gas, and that an odor of asafetida is imparted to it, so that leaks may be readily discovered without impairing the illuminating or heating qualities of the gas.

I do not limit myself to odorizing the gas by the asafetida contained in the receptacles $n$, as the odorization of the gas may be effected equally as well at any stage of the process by placing the asafetida in suitable receptacles in any one of the tanks $a$, $g$, or $i$, or in all of them, as may be desired.

I am aware that it is not new to purify gas by causing it to pass, first, through lime and water, and, second, through dilute sulphuric acid. I am also aware that gas has been purified by acid, and at the same time odorized by coal peat or oil of almonds, and I do not desire to claim the same.

Having thus described my invention, what I claim, and desire to secure by Letters Patent, is—

1. As an improvement in the art of preparing natural gas for combustion, bringing it in contact with asafetida, substantially as and for the purpose described.

2. As an improvement in the art of preparing natural gas for combustion, passing it, first, through lime and water; second, through sulphuric acid and water, and, third, bringing it in contact with asafetida, substantially as and for the purpose described.

In testimony whereof I have hereunto set my hand this 22d day of November, A. D. 1884.

his
JOSEPH × KOUNTZ.
       mark.

Witnesses:
W. B. CORWIN,
THOMAS W. BAKEWELL.